May 1, 1923.
W. V. PUMPHREY
1,453,727
ADJUSTABLE LICENSE PLATE HOLDER
Filed Feb. 23, 1922
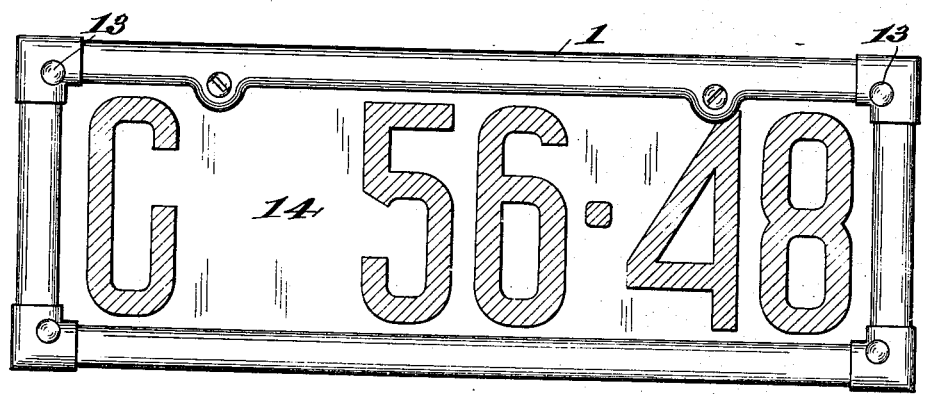
Fig. I.
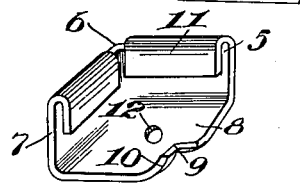
Fig. III.
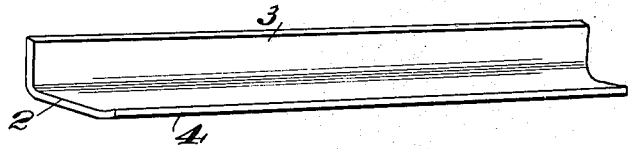
Fig. II.
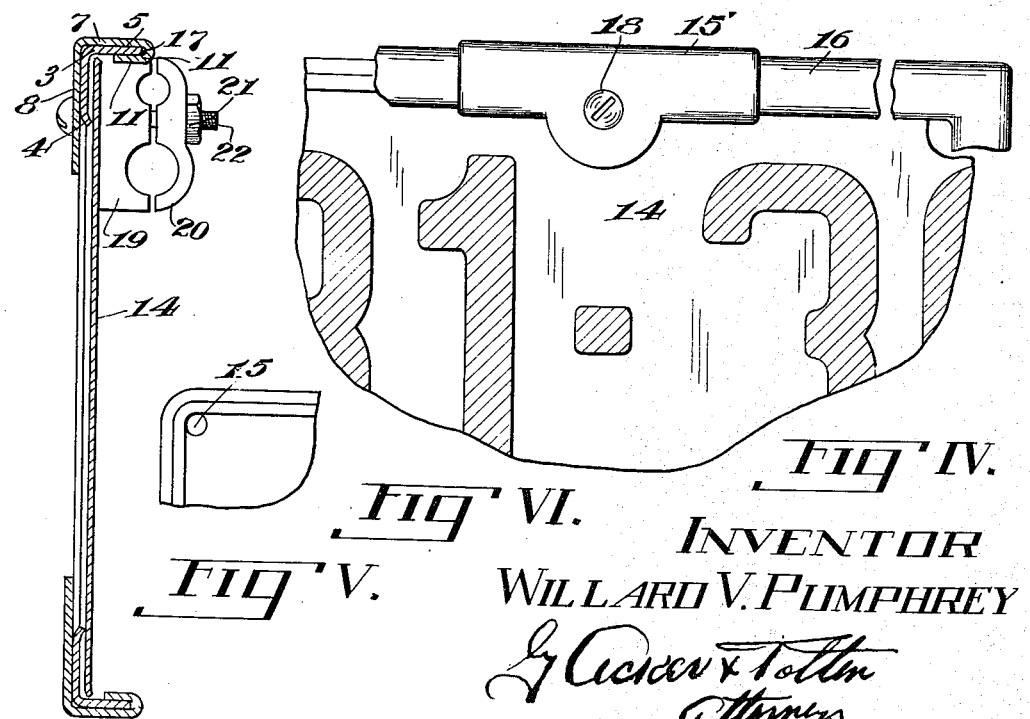
Fig. IV.
Fig. VI.
Fig. V.
INVENTOR
WILLARD V. PUMPHREY Patented May 1, 1923.

1,453,727

UNITED STATES PATENT OFFICE.

WILLARD V. PUMPHREY, OF OAKLAND, CALIFORNIA.

ADJUSTABLE LICENSE-PLATE HOLDER.

Application filed February 23, 1922. Serial No. 538,662.

*To all whom it may concern:*

Be it known that I, WILLARD V. PUMPHREY, a citizen of the United States, residing at Oakland, in the county of Alameda and State of California, have invented certain new and useful Improvements in Adjustable License-Plate Holders, of which the following is a specification.

The present invention relates to improvements in holders or mounting frames designed particularly for use in connection with motor vehicle license plates, and particularly to that type of frame set forth in the application for Letters Patent of Samuel Spitz, patented February 28, 1922, and numbered 1,407,896.

The present license plate frame is designed for universal use, that is for receiving license plates of various lengths and widths, adapting the construction for receiving license plates of the dimensions issued by the various States throughout the country. The previously referred invention illustrates a solid frame adapted for receiving a license plate of a particular dimension, and in view of the fact that the dimensions of the license plates issued by various States vary, it has been found necessary to make these frames in different sizes.

By my present invention I provide a frame construction consisting of several easily assembled parts adapted, when assembled, for receiving a vehicle license plate, and to which the plate is secured, and the members are in turn held in assembled relation by securing means passing through certain portions of the frame forming members and through the license plate, openings formed in the license plate, in its manufacture, being utilized in receiving the fastening means.

The invention consists primarily in providing a license plate frame composed of channeled frame forming members received at their ends in anchoring members, which are in turn united to the license plate by attaching members passing therethrough, and which hold the same in a position surrounding the peripheral edge of the license plate, with the license plate received within the frame.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Fig. 1 is a view in front elevation of the preferred embodiment of my improved frame with a license plate mounted therein.

Fig. 2 is a view in perspective of one of the frame forming members.

Fig. 3 is a perspective view of one form of anchoring member for the frame forming members and which is united to the license plate.

Fig. 4 is a view in elevation of a section of a frame illustrating a modified form of anchoring member.

Fig. 5 is a vertical sectional view taken through a construction employing my modified form of anchoring member.

Fig. 6 is a broken detail of one corner of a license plate illustrating the hole for the securing device formed therein.

My present frame comprises the assembled frame forming strips 1 constituting the top, bottom and ends of the frame, the top and bottom forming strips being of the same length and the end forming strips also corresponding to each other in length. Each of the strips 1 is substantially L-shaped in cross section providing a frame forming portion 2, and a laterally extended outer peripheral edge forming portion 3. The opposing edge of the face forming portion 2 is inwardly bent, as at 4, forming a rounded inner peripheral edge for the frame. The outer peripheral edge 3 of the strips 1, at opposite ends of the strips, are adapted for receiving end channels 5 formed in a frame corner 6, the peripheral walls or edges of which are upwardly bent, as at 7, and are disposed at right angles to each other, said walls being connected by a face plate 8 forming an integral part thereof, which frame plate is notched, as at 9, and inturned on its inner peripheral edge, as at 10, to afford a rounded inner corner for the frame corner member.

The channels 5 are formed by inwardly turning an extension in the peripheral wall 7 to form therefrom an overhanging lip 11 slightly spaced from the inner surface of the wall 7. The portion 8 of the respective corner members is provided with an aperture 12 for receiving a securing means, preferably in the form of a rivet 13, which passes through an aperture in the corner of the license plate 14 received within the assembled frame.

In assembling the frame, the end of the channels 5 disposed at right angles to each other admits of the adjustment of the ends of the strips 1 therein in the forming from said strips of frames of various sizes within certain limits. The strips 1 forming the top and bottom edges of the frame are disposed in parallel relation and over the opposite end of each is fitted a corner member with the associated channel in each disposed toward the opposite strip. The end forming strips 1 are then inserted into said respective channels in the corner members forming an open frame, the outer and inner peripheral edges of which are rounded or curved in the same direction. This frame in cross section is of channeled construction and from the rear thereof there is inserted the license plate 14. The license plates as usually manufactured are provided in their respective four corners with apertures 15 for receiving securing means, and one of these apertures is aligned with each of the apertures 12 in the corner members and through said corner members from the front or face thereof is inserted the uniting means 13, preferably of rivet form.

The members 13, it will be observed, unite the corner members 6 to the opposite corners of the license plate 14, and thus hold the strips 1 in position surrounding the frame and preventing the same from being disengaged from the license plate without first removing the securing means 13.

In the modified construction illustrated in Figs. 4 and 5, the corner members are dispensed with and an adjustable sleeve connection 15' is employed for receiving the inner ends of the frame forming strips 16, which in this case are at least two in number for each wall. The sleeve 15' in the modified construction is constructed similarly to the corner piece except that the channel 17 therein extends continuously therethrough.

In this construction, a securing means or bolt 18 passes through the sleeve 15' and through the license plate 14, anchoring the sleeve to the license plate.

In mounting the license plate and frame, a conventional form of split clamp, consisting of the sections 19 and 20 drawn together by the adjustment of the nut 21 on bolt 22, is employed, this construction being fully described in the patent previously mentioned.

This present construction enables the frame and corner sections to be stamped from suitable material and does not limit the construction to a molded or cast article.

I claim:—

1. A vehicle license plate holder comprising a plurality of frame forming members substantially L-shaped in cross section, said frame forming members adapted for arrangement about the periphery of a license plate with their ends in cooperating relation, a slotted part for receiving with a longitudinal movement the cooperating ends of the respective frame forming members, and with which the same have interlocking relation and securing means passing through said respective parts and license plate for holding the license plate within the frame and the frame sections in interlocking relation.

2. A vehicle license plate holder comprising a plurality of frame side and end forming members, each substantially L-shaped in cross section and adapted for arrangement about the periphery of a license plate with their ends in cooperating relation, a plurality of frame corner members formed with inturned lips providing channels into which said frame forming members are inserted with a longitudinal movement and through which channels, said cover members have interlocking engagement with the corresponding ends of said frame forming members, and means passing through the corner members and the license plate for holding the license plate within the frame and the frame forming members in interlocked relation.

In testimony whereof I have signed my name to this specification.

WILLARD V. PUMPHREY